J. J. CHARLEY.
SPRING SUSPENSION FOR VEHICLES.
APPLICATION FILED MAY 10, 1913.
1,137,741.
Patented May 4, 1915.
2 SHEETS—SHEET 1.
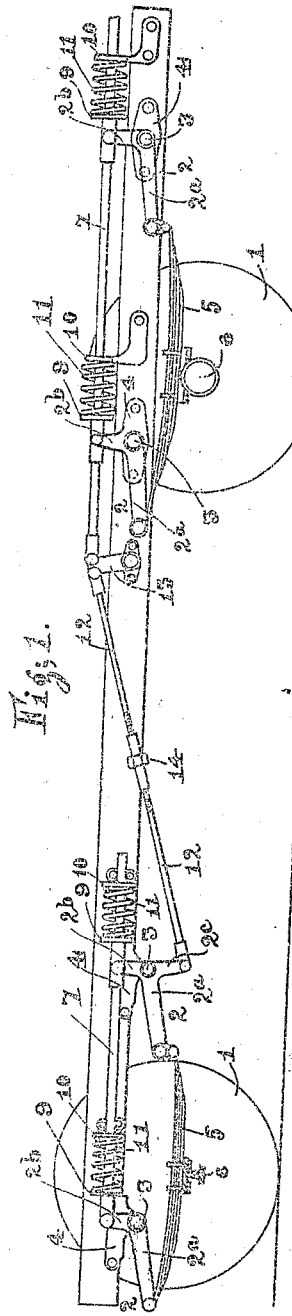
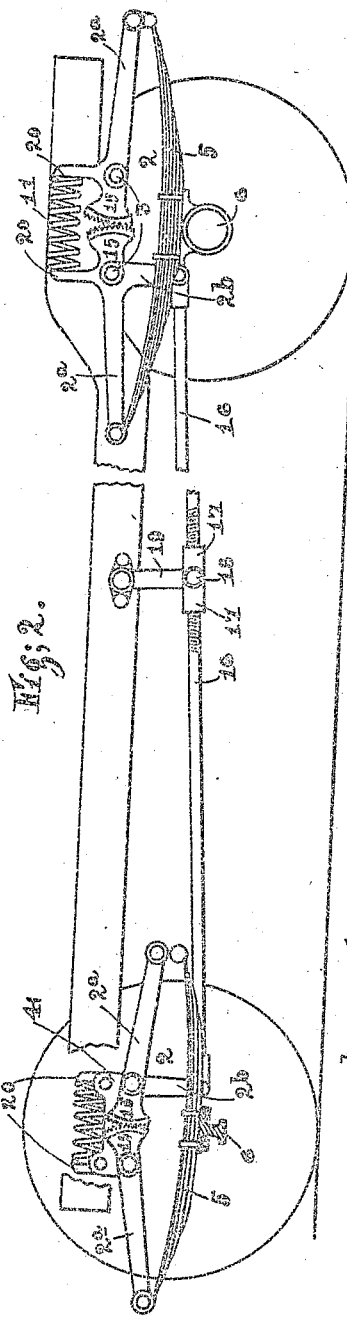
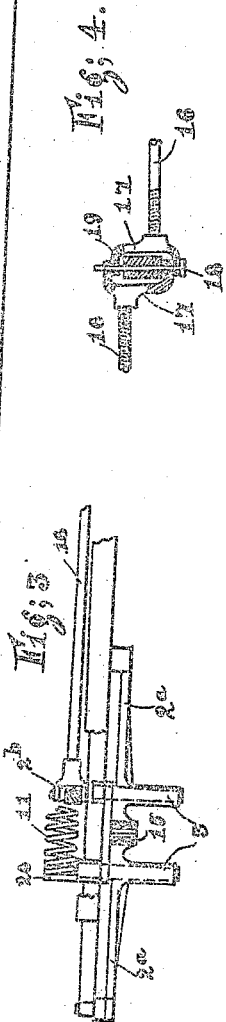
Witnesses
Inventor
John Joseph Charley
by
Attorney J. J. CHARLEY.
SPRING SUSPENSION FOR VEHICLES.
APPLICATION FILED MAY 10, 1913.
1,137,741.
Patented May 4, 1915.
2 SHEETS—SHEET 2.
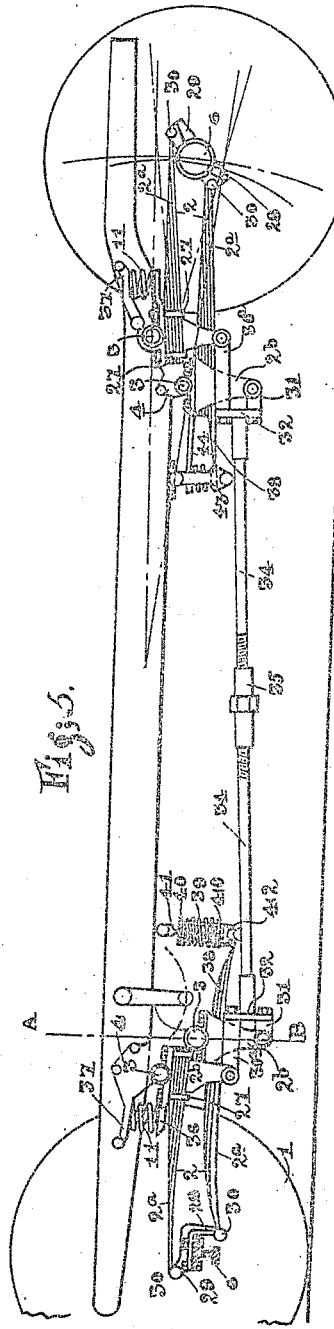
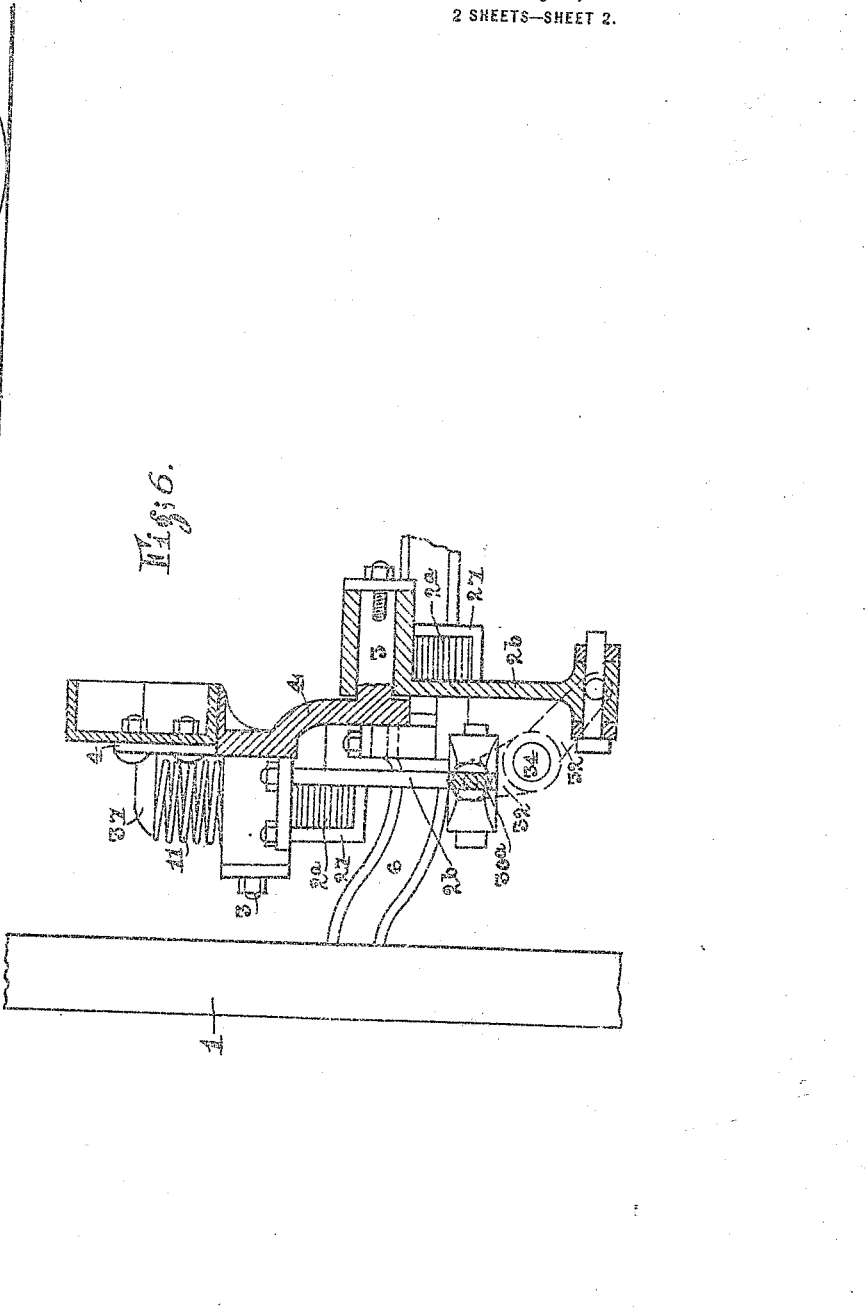

UNITED STATES PATENT OFFICE.

JOHN JOSEPH CHARLEY, OF MALVERN, VICTORIA, AUSTRALIA.

SPRING SUSPENSION FOR VEHICLES.

1,137,741.  Specification of Letters Patent.  Patented May 4, 1915.

Application filed May 10, 1913. Serial No. 766,847.

*To all whom it may concern:*

Be it known that I, JOHN JOSEPH CHARLEY, a subject of the King of England, residing at Malvern, in the State of Victoria, Commonwealth of Australia, have invented a certain new and useful Spring Suspension for Vehicles, of which the following is a specification.

This invention relates to improvements in a vehicle suspension for absorbing and reducing road shocks and the like, and the invention consists in novel means for keeping a vehicle in a normal plane with the road when passing over inequalities therein, including the use, for each wheel, of a pair of double armed wheel or axle carrying rockers arranged in tandem in such a manner as to allow free movement of the wheel axles between the ends of said rockers.

The invention also comprises the combination with said rockers of particular arrangements of plane controlling or normalizing springs and in certain details of construction and combinations of parts, all as hereinafter fully described and specifically pointed out in the appended claims.

Various embodiments of the invention are illustrated in the accompanying drawings, in which—

Figure 1 is a side elevation of one form of construction with the axle in section. Fig. 2 is a similar view of a second form of construction. Figs. 3 and 4 are sectional detail plan views of parts shown in Fig. 2. Fig. 5 is a side elevation of a third form of the construction. Fig. 6 is a section on an enlarged scale taken on the line A—B of Fig. 5.

Referring particularly to Fig. 1 of the drawings, I provide for each wheel 1 a pair of double armed rockers or levers 2 disposed in tandem, each rocker being pivotally mounted at 3 upon a bracket 4 secured to the chassis or frame of the vehicle, the pivot being shown as nearer one end of the rocker than the other and the rockers being shaped to produce a substantially horizontal arm $2^a$ and a substantially vertical arm $2^b$, the former arm of each rocker at the front or left hand end of the vehicle being shown as extending away from the longitudinal center of the vehicle, while the similar arm of each rocker at the rear of the vehicle is shown as extending toward said longitudinal center.

The free ends of the horizontal arms of each pair of rockers 2 are interconnected by means of a member 5 which carries or supports the wheel axle 6, such member in the construction illustrated being of such a character, viz. in the form of a laminated spring, as to yield slightly to twisting strains, and being otherwise unattached to the vehicle.

The free ends of the vertical arms $2^b$ of each pair of rockers are interconnected by means of a rigid connection shown in the form of a rod 7, the connections between the rockers being in each case of a pivotal or hinged character so that on the wheel encountering an obstruction or inequality in the road surface and imparting an oscillating movement to one rocker about its pivot, similar movements will be imparted to the adjacent rocker by means of the connection 7. On each rod or connection 7, preferably adjacent each rocker, is rigidly secured a collar or disk 9 between which and an abutment 10 secured to the chassis is a coiled spring 11 encircling the rod, the latter passing loosely through said abutment.

Each pair of rockers at opposite ends of the vehicle on the same side thereof are interconnected in such a manner that the rockers for each wheel or pair of wheels are caused to act equally and unitedly, this interconnection being shown as comprising a rod 12 pivoted at one end to a downward extension $2^c$ of the vertical arm $2^b$ of the rear rocker of the forward pair and passing upwardly in an inclined direction, its opposite end being pivoted to a rocking bracket 13 mounted on the chassis to which is also pivoted one end of the connecting rod 7 of the rear pair of rockers, to which rod the vertical arms $2^b$ of said rear rockers are pivotally attached. The rod 12 is preferably in two parts connected by a screw coupling 14 for purposes of adjustment. With the construction described it will be seen that on shock being imparted to the front wheel 1 tending to lift this end of the vehicle, the horizontal arms $2^a$ of the rockers will be oscillated upward about their pivots, this movement being in unison for a pair owing to the connection 7, and that the said oscillation of the front pair of rockers will be transmitted to the rear pair of rockers through traction exerted on the connecting rod 12, oscillating the horizontal arms of said rear pair downward about their pivots and tending to raise the rear end of the vehicle to an extent equal to that of the front end, thus keeping the vehicle in a normal plane with the road surface, the springs 11 having a restraining effect on the action of the rockers and preventing the chassis from getting abnormally out of plane with the road. These springs may consequently be termed "normalizing" or "plane controlling" springs and are thus hereinafter referred to.

Referring to the construction shown in Figs. 2 to 4, I still provide for each wheel two rockers 2 disposed in tandem, but the pivotal points 3 of said rockers are located close together and the rockers themselves are geared together by forming the adjacent ends of the rockers as toothed segments 15 which intermesh as shown so that the movements of one rocker are correspondingly imparted to the other. In this construction it will be seen that the longer arms $2^a$ of the rockers extend in opposite directions and the free ends thereof are interconnected by the axle-carrying member 5 also shown in the form of a laminated spring, and that it is necessary to provide only one rocker of a pair with a vertical arm $2^b$ for transmission of rocker movement to the connections extending to another pair of rockers. In the construction under consideration this connection is in the form of a thrust rod 16 and to provide for differences in plane between the front and rear of the vehicle due to the usual practice of making the former narrower than the latter, said rod may be in two parts having bifurcated ends 17 connected by means of a bolt or pin 18 which is supported by a swinging hanger 19 suspended from the chassis. The normalizing or plane controlling springs 11 are disposed between vertical members 20 extending upward from the rocker arms $2^a$ and are in compression, thus tending to return said arms to normal. The operation of this form of construction is substantially similar to that of Fig. 1; thus on the front wheel receiving a shock, rocker arms $2^a$ are oscillated upward in unison due to intermeshing segments 15 and the rear rocker of the front pair transmits this movement through arm $2^b$ through rod 16 as a thrust to arm $2^b$ of the rear pair of rockers, thus moving the arms $2^a$ thereof downward and imparting an upward movement to the chassis at this end, the springs 11 acting as above described with reference to Fig. 1.

Figs. 5 and 6 show a still further form of construction in which the tandem rockers 2 are in themselves made resilient, that is to say, the horizontal arms $2^a$ thereof are so formed, being shown in the form of laminated springs, which are secured as by shackles 27 to the vertical arms $2^b$ of the rockers which latter arms are pivoted at 3 to the bracket 4 secured to the chassis, said pivots being placed one above the other and further one of said pivots being placed more or less below or inside the frame and the other outside the frame, as more particularly shown in Fig. 6, the outside pivot being shown as the higher and most forward of the pair. This arrangement while giving all the necessary clearance to the rockers one in relation to the other also permits of the lower rocker being free to work under the frame, and a further advantage is that owing to the spring arm $2^a$ nearest the transverse center of the vehicle being sensibly lower than the other spring arm $2^a$, the twisting strain is considerably reduced when one wheel encounters a road inequality, than if the inner spring arm were higher or even level with the outer spring arm. For this reason it is desirable that the rocker arms be kept as low as possible and to obtain this effect it is preferably to connect the free end of one of the spring rocker arms $2^a$ to a connection 28 below the axis of the axle 6, and the free end of the companion arm to a connection 29 above said axis, the spring arms extending rearwardly to their connection with the arms $2^b$ in as nearly a horizontal direction as practicable. The aforesaid connections 28 and 29 at the front of the vehicle are preferably in one piece of angular formation as shown and secured to the ordinary seat provided on the axle 6. This connection will also have the necessary flanges or bosses 30 to produce the usual hinged joints in order that the spring arms $2^a$ may be free to work. By pivoting the rockers one outside and one more or less inside the chassis as described, the use of special through transverse connections is dispensed with except in extreme cases.

The vertical arms $2^b$ of each pair of rockers are interconnected by means comprising arms $30^a$, 31, and a bar 32, the bar 32 being connected to a pull rod 34 in two parts connected by a screw union 35. By this method of interconnecting the rockers of a pair and the pairs between themselves (Fig. 5), with the rod 34 sufficiently rigid to resist all bending strains that may be occasioned by one rocker of a pair under unforeseen conditions being called upon to work more than its fellow, both spring arms or rockers of a pair work synchronously and evenly. The normalizing and plane controlling spring 11 for each pair of rockers is disposed between a horizontal arm 36 on the rocker and an abutment 37 which may form an extension of the aforesaid bracket 4, this spring being in compression.

One or both of the spring rocker arms $2^a$ may extend beyond its support on its arm $2^b$ and form a plane controlling spring, the lower spring arm being shown as so extended in the drawing at 38, and in addition to this feature I may provide, between the end of said spring extension and the chassis, a further spring 39 to assist the plane controlling or normalizing action. At the left of Fig. 5 this spring is held between two abutments 40, one secured to a bolt 41 pivoted to the chassis and the other to a forked member 42 pivoted to the end of the spring extension 38. At the right hand end of said figure the spring 39 is held between an abutment constituted by a pivoted hanger 43 suspended from the chassis and an arm 44 extending rearward from the rocker, these two devices being alternatives of one another. The operation of this form of construction is in all respects identical to the constructions described with reference to Figs. 1 and 2.

The constructions shown in Figs. 1, 2 and 5 are particularly adapted for use with the through-axle type of vehicle and may be readily applied to vehicles of known or existing kinds.

In the type of vehicle in which the wheels are mounted independently of each other, I prefer to use solid or rigid rockers which may be mounted as hereinbefore described. In the case of both resilient and rigid rockers the systems above described admit of single rockers being used at one end of the vehicle in conjunction with double rockers at the other end thereof. Again, detail modifications of the various constructions herein described may be adopted without departing from the spirit of the invention, for example, the vertical arms of the rockers may be directed either upward or downward from the pivots, the horizontal arms may extend toward or away from the longitudinal center of the vehicle, and the connecting member between the front and rear pairs of rockers may be inclined or horizontal according to requirements.

What I claim as my invention and desire to secure by Letters Patent of the United States is:—

1. In a vehicle suspension, the combination with a chassis and running wheels, of double armed rockers pivoted to said chassis, one pair for each wheel disposed in tandem, an axle carrying element supported between said rockers permitting free movement of the axle between ends of said rockers, a separate and independent resilient plane controlling or normalizing element located above the pivots of and in operative connection with each pair of rockers, and connecting means between the rockers of one wheel and the rockers of another wheel at the same side of the vehicle for transferring shock from one pair of rockers to the other.

2. In a vehicle suspension, the combination with a chassis and running wheels, of double armed rockers of a resilient character pivoted to said chassis, one pair for each wheel disposed in tandem, an axle carrying element supported between said rockers permitting free movement of the axle between ends of said rockers, a separate and independent resilient plane controlling or normalizing element in operative connection with each pair of rockers and disposed adjacent to said rockers and above the pivots thereof; and connecting means between the rockers of one wheel and the rockers of another wheel at the same side of the vehicle for transferring shock from one pair of rockers to the other.

In witness whereof I have signed this specification in the presence of two witnesses.

JOHN JOSEPH CHARLEY.

Witnesses:
   VINTON H. PARKER,
   ARTHUR T. WAYHORN.